(No Model.)

N. DE KABATH.
SECONDARY BATTERY.

No. 263,124. Patented Aug. 22, 1882.

Witnesses
1. Hiram S. Maxim.
2. Jean-Baptiste Rolland

Inventor:
Nicolas de Kabath

UNITED STATES PATENT OFFICE.

NICOLAS DE KABATH, OF PARIS, FRANCE.

SECONDARY BATTERY.

SPECIFICATION forming part of Letters Patent No. 263,124, dated August 22, 1882.

Application filed January 6, 1882. (No model.) Patented in France August 27, 1881, No. 144,597; in Belgium September 2, 1881, No. 55,632; in England September 19, 1881, No. 4,037; in Italy September 30, 1881, XXVI, 409, and in Spain December 20, 1881, No. 2,090.

*To all whom it may concern:*

Be it known that I, NICOLAS DE KABATH, of Paris, France, have invented Improvements in Secondary Batteries; and I do hereby declare that the following is a full, clear, and exact description of the same, reference being had to the annexed sheet of drawings, making a part of the same.

The Planté battery, as heretofore constructed, can only store a very limited quantity of electricity for a given surface of its electrodes. This proportion of electricity depends upon the thickness of the layer of bioxide of lead ($PbO_2$) which is deposited on the positive electrode, and also of the layer of spongy pulverized lead (Pb) deposited on the negative one. These layers must only be very thin, as they fall down when a certain thickness is exceeded. The storing capacity of the apparatus is therefore reduced to a certain extent. Thus the applications of the Planté battery, such as heretofore constructed, are confined within a certain limit, which cannot be exceeded without risk of destroying the apparatus. Moreover, the construction of these Planté elements requires much time and careful attention, chiefly as regards the layers of bioxide of lead ($PbO_2$) and lead (Pb.) In order to obtain an efficient apparatus, it is necessary to employ a current of limited energy, but as constant as possible, till the preparation is completed, which requires six or seven days. If this precaution is not observed, the layers of lead, instead of forming each a smooth and uniform body, are divided into a series of layers of various thicknesses, and are therefore more easily detached from the electrodes.

My invention has for its object to obviate the above deficiencies and to provide means for obtaining an electric secondary battery in which the layers of bioxide of lead and spongy lead respectively deposited on the positive and negative electrodes may be of a comparatively enormous thickness without being liable to fall from the said electrodes and check the storage of electricity. These layers may be suitably obtained irrespective of the variations of the current, and their formation requires but a comparatively short time.

In order to put my invention into practice, I take a sheet of lead one-half a millimeter in thickness, Figure 1, and I coat the same with weak sulphuric acid, ($H_2SO_4$,) so as to produce upon its surface a thin layer of sulphate of lead, ($PbSO_4$.) I treat by the same process a certain number of sheets of about one-tenth of a millimeter in thickness. I cover the plate *a* with these sheets *b b*, as shown in Fig. 1 of the drawings, so as to place their ends at the top of the apparatus and admit of the gases escaping when the battery is being charged. The sheets are then packed in artificial parchment *c*, one or more layers of which are used according to the internal resistance to be obtained. The parchment in this case has a threefold action. First, it connects all the plates or sheets together; second, it increases the internal resistance of the apparatus; third, it insulates the compound electrodes from one another. The sheets employed may, however, have any suitable shape and size—for instance, one of the smooth or corrugated shape shown in Figs. 2 and 3; but in order to obtain a considerable surface with a very light weight I prefer to employ the arrangement shown in Figs. 4, 5, 6, 7, 8, in which the same letters of reference refer to the same parts. According to this arrangement the electrode consists of a series of strips, *a* and *b*, of any suitable size, held in a bunch by means of a thicker strip, *c*, which surrounds them, and is maintained by rings *d*, of india-rubber or other equivalent material. The strips *a* are corrugated or plaited, as shown in Fig. 8, while the strips *b* are straight, as shown in Fig. 7, and have the same length and width as the former. By placing side by side any suitable number of alternately plaited and straight strips an electrode having a very considerable surface with a small weight is obtained. The plaits may be of any convenient shape and size. Of course the strips employed in this electrode are treated.

Fig. 9 of the drawings shows the manner of placing the electrodes of the secondary battery together. The electrodes A, obtained and arranged as above described, are placed either parallel to each other or in a transverse direction, so as to act either by quantity or by tension. The elements thus combined are wrapped in parchment, the joints of which, as well as those of the envelopes of the electrodes, are pasted by gutta-percha dissolved in chloroform. The battery thus formed is placed in a lead box, d, Fig. 9, the walls of which are also covered with thin sheets of lead, said walls acting in the battery together with an uneven number of electrodes.

I claim—

1. A compound electrode for secondary batteries, formed of very thin sheets of lead having a coating of sulphate of lead placed upon a thicker one and wrapped in artificial parchment, said sheets being either smooth or plaited, as and for the purposes set forth.

2. A compound electrode for secondary batteries, formed of a series of alternately straight and plaited strips, a and b, having a coating of sulphate of lead held in a bunch by means of a thicker strip, c, and india-rubber or other rings, d, and wrapped in artificial parchment, as and for the purposes set forth.

3. In a secondary battery, the combination, with a leaden box internally lined with thin sheets of prepared lead, of the electrodes formed substantially as herein shown and described, and arranged in the said box, wrapped together, either in a transverse or parallel direction, with artificial parchment, as set forth.

NICOLAS DE KABATH.

Witnesses:
HIRAM S. MAXIM,
JEAN BAPTISTE ROLLAND.